May 10, 1932.　　　W. B. STOUT　　　1,857,888
AIRPLANE LANDING DEVICE
Filed May 21, 1929

INVENTOR.
William B. Stout
BY
ATTORNEYS.

Patented May 10, 1932

1,857,888

UNITED STATES PATENT OFFICE

WILLIAM B. STOUT, OF DETROIT, MICHIGAN

AIRPLANE LANDING DEVICE

Application filed May 21, 1929. Serial No. 364,742.

This invention relates to aeronautic control and safety devices and more particularly to methods of and means for obtaining greater safety in landing.

One of the objects of the invention is to provide a means for enabling easy landing despite the loss of a wheel or a portion of the landing gear. The loss of a wheel or even the deflation of a tire constitutes a flying hazard rarely foreseen, whose occurrence requires extreme skill in piloting to prevent a serious accident. Applicant aims to overcome this hazard by providing a third wheel, adapted to be mounted as a spare, and yet be available for use, if necessary, with either or all of the usual landing wheels.

A feature of the invention, therefore, resides in the provision of an extra wheel, inflated for emergency use, and mounted in position to cooperate with the ordinary landing gear.

Another feature resides in the use of a retractible chassis adapted to be adjustably positioned so that its wheels may be positioned with their axes coincident with that of a mounted spare wheel, or lowered below the axis of the spare. By fully retracting the chassis during flight, its parasitic resistance is eliminated; and, in fact, a landing may be made only on the third wheel, if necessary.

A further feature resides in the use of wheels of the "Musselman" type, provided with an inner braking structure completely protected from the elements. The braking apparatus is suitably encased in a container mounting a rubber covering. This container and covering constitute, in effect, an inner wheel and tire and may serve as such in an emergency upon the deflation of the outer tire.

Figure 1:
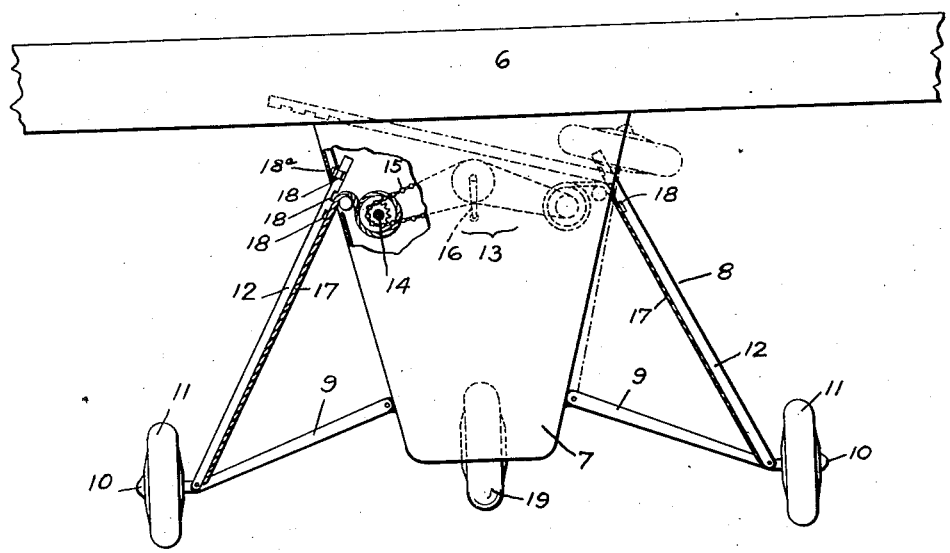
Figure 2:
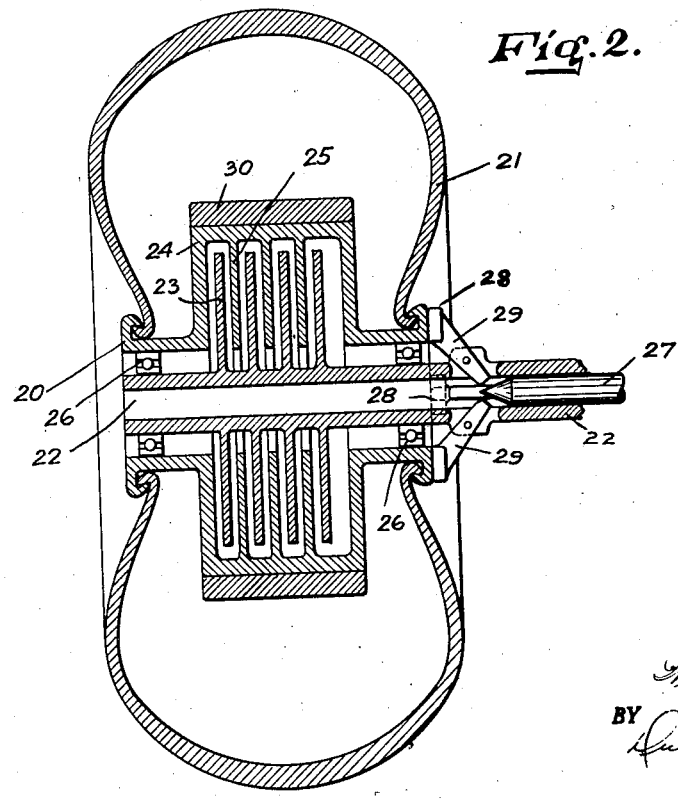

These and other safety factors and operating advantages, for carrying out the objects and features of the invention, will be more apparent from the following description read in connection with the accompanying drawings, in which:

Fig. 1 is a fragmentary view of a plane structure equipped with a retractible chassis and third wheel in accordance with the invention; and Fig. 2 is a detailed section, on a larger scale, of a wheel employing applicant's internal braking structure.

Considering all the figures, similar designations referring to similar parts, numeral 6 refers generally to a plane structure having a fuselage 7 equipped with a retractible chassis generally designated by the numeral 8. The chassis is provided with swingable axle struts 9 terminating in hubs 10 mounting wheels 11. Brace 12 is arranged to cooperate with strut 9 so that the wheels may sustain the weight of the plane without causing collapse or involuntary retraction of the chassis.

As illustrated, mechanism 13, for retracting the chassis to the dotted line position, may be of any suitable design. Applicant, for illustrative purposes, shows a gear 14 and chain 15 operated by a turning handle 16 suitably mounted for actuating cable 17. The braces 12 are shown suitably notched as at 18 so that they may be retained in position and assure retention of the chassis in open position capable of withstanding landing strain. Spring clip 18a is designed to retain the braces 12 in desired notched position, and by retracting the spring, the brace may be shifted to different notches. It is obvious that suitable equivalents, dictated by mechanical expediency, may be adopted for retracting the chassis and keeping it in open intermediate or retracted position. By shifting the braces, it is obvious that the chassis may be arranged to assume a plurality of positions. The wheel 19 is suitably positioned as illustrated as a third wheel, preferably midway between the positions assumed by wheels 10. This third wheel may depend from the fuselage or be suitably mounted underneath. Consequently, it may be arranged with its axis in line with the axes of the other wheels, or it may be positioned forward of or abaft the other wheels. Ordinarily, it may be found desirable to mount the third wheel in line with the other two. It is apparent that if one of the wheels 10 were lost, a landing could be made on the other wheel and the third wheel. By suitably adjusting the chassis, the wheels 10 may be arranged to land on the same level as the third wheel. This may be of advantage under great loads.

By retracting the chassis during flight, the parasitic resistance otherwise attributed thereto will be eliminated. Since the third wheel may be shielded by the fuselage, in part, the parasitic resistance due thereto is reduced to a minimum. It is also apparent that, if necessary, a landing may be made on the third wheel alone, since it is on the center line of the plane and may be positioned at the center of gravity.

In Fig. 2, the wheel is shown in greater detail. Hub 20 is designed to accommodate tire 21. Within the hub is positioned shaft 22 having a plurality of disks 23 integral therewith and mounted thereby. The hub is formed with an extension 24 which has a plurality of disks 25 inwardly depending therefrom and positioned intermediate the disks 23. The shaft 22 is suitably mounted and retained within the hub by bearings 26. By this arrangement, the disks are protected from the elements and retained free from water, grit, etc. The hub is designed to be actuated by a lever arm 27 arranged to bear against spring fingers 29 having bearing surfaces 28 positioned adjacent the hub as illustrated. As a result, the actuation of rod 27 against the spring fingers will cause the surfaces 28 to move forward thereby causing a corresponding movement of the hub. Since the shaft remains relatively stationary during the movement of the hub, even though the wheel may be rotating, the disks 23 will frictionally engage disks 25 and effect a braking action. The spring fingers 29 will insure retraction of the shaft to normal position when the pressure on lever arm 27 is relieved. The enclosed nature of the hub, which is actually a housing, protects the disks from the action of the elements, insuring perfect interengagement and frictional contact at all times.

Hub extension 24 has an outer circular surface on which a rubber covering 30 may be mounted. This rubber covering is, in effect, a rubber tire, which may act as such upon the deflation of the outer tire 21. While covering 30 is illustrated in the form of a hard rubber tire, it is evident that it could be in the form of a pneumatic tire as desired. Thus, in an emergency, the puncturing of tire 21 would still enable landing on the inner rubber tire 30.

Since certain changes may be made in the above construction, and different embodiment of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. An airplane having a spare wheel mounted under the fuselage for supporting the plane, a chassis mounted on said fuselage having a pair of transversely spaced wheels for normally supporting the plane on the ground, the wheels on the chassis being arranged to be used alone or with the spare wheel.

2. An airplane having a plurality of wheels mounted upon a chassis, means for adjusting the chassis to vary the position of any of said wheels with respect to the fuselage, a spare wheel mounted under the fuselage, the axis of the spare wheel being fixed.

3. An airplane having a wheel centrally positioned to support the plane, said wheel being fixed in position, another wheel for supporting the plane, said other wheel being adapted to have its axis shifted below or above that of the fixed wheel.

4. An airplane having a chassis, wheels on the chassis, means for retracting the chassis, a spare wheel positioned beneath the fuselage to be normally inoperative when the chassis is in position with its wheels supporting the plane, said means being adapted to vary the position of said wheels so that the spare wheel may be used in combination therewith.

5. An airplane comprising a fuselage, a pair of transversely spaced landing wheels supported to said fuselage, and a spare wheel located between and slightly above said pair of wheels.

6. An airplane comprising a fuselage, a pair of transversely spaced landing wheels attached to said fuselage, and a spare wheel attached to the forward portion of said fuselage and located in planes between and slightly above the respective planes of said pair of wheels.

In testimony whereof I affix my signature.

WILLIAM B. STOUT.